(12) United States Patent
Kondo et al.

(10) Patent No.: US 10,252,425 B2
(45) Date of Patent: Apr. 9, 2019

(54) SYSTEM FOR DETERMINING ROBOT POSITION HAVING AN IMAGING ELEMENT TO IMAGE THE MARK ON A ROTATABLE ARM

(71) Applicant: Seiko Epson Corporation, Tokyo (JP)

(72) Inventors: Takayuki Kondo, Chino (JP); Daiki Tokushima, Azumino (JP)

(73) Assignee: Seiko Epson Corporation (JP)

( * ) Notice: Subject to any disclaimer, the term of this patent is extended or adjusted under 35 U.S.C. 154(b) by 39 days.

(21) Appl. No.: 15/470,049

(22) Filed: Mar. 27, 2017

(65) Prior Publication Data

US 2017/0274537 A1 Sep. 28, 2017

(30) Foreign Application Priority Data

Mar. 28, 2016 (JP) .................................. 2016-063906

(51) Int. Cl.
| | | |
|---|---|---|
| *G01D 5/347* | (2006.01) | |
| *B25J 13/08* | (2006.01) | |
| *B25J 9/04* | (2006.01) | |
| *B25J 17/02* | (2006.01) | |
| *B25J 19/02* | (2006.01) | |
| *G05B 19/12* | (2006.01) | |
| *B25J 9/00* | (2006.01) | |

(52) U.S. Cl.
CPC ............ *B25J 13/089* (2013.01); *B25J 9/0009* (2013.01); *B25J 9/042* (2013.01); *B25J 9/044* (2013.01); *B25J 17/0283* (2013.01); *B25J 19/021* (2013.01); *B25J 19/022* (2013.01); *B25J 19/023* (2013.01); *G01D 5/34707* (2013.01); *G05B 19/124* (2013.01)

(58) Field of Classification Search
CPC .... B25J 13/089; B25J 17/0283; B25J 19/021; B25J 19/023; B25J 9/042; B25J 9/044; G01D 5/34707; G05B 19/124
USPC ...................................................... 250/231.13
See application file for complete search history.

(56) References Cited

U.S. PATENT DOCUMENTS

| | | | | |
|---|---|---|---|---|
| 7,102,123 | B2 * | 9/2006 | Chin ................... | G01D 5/34715 250/231.13 |
| 9,805,455 | B2 * | 10/2017 | De Coi ................. | G06T 7/0004 |

FOREIGN PATENT DOCUMENTS

| | | |
|---|---|---|
| JP | 62-264887 A | 11/1987 |
| JP | 01-051284 A | 2/1989 |
| JP | 01-228789 A | 9/1989 |
| JP | 01-297512 A | 11/1989 |
| JP | 2006-041095 A | 2/2006 |

* cited by examiner

*Primary Examiner* — Que Tan Le
(74) *Attorney, Agent, or Firm* — Harness, Dickey & Pierce, P.L.C.

(57) ABSTRACT

A robot includes a first member, a second member that is provided to be turnable about a turning axis with respect to the first member, marks that are disposed around the turning axis on a surface of the second member, and a mark detection portion that is disposed in the first member and detects the marks.

7 Claims, 7 Drawing Sheets

SYSTEM FOR DETERMINING ROBOT POSITION HAVING AN IMAGING ELEMENT TO IMAGE THE MARK ON A ROTATABLE ARM

BACKGROUND

1. Technical Field

The present invention relates to a robot and an encoder.

2. Related Art

An optical rotary encoder is generally known as one kind of encoder (for example, refer to JP-A-62-264887). For example, in a robot provided with a robot arm having a turnable joint, the rotary encoder detects rotation states such as a rotation angle, a rotation position, a number of rotations, and a rotation speed of the joint. Detection results thereof are typically used to control driving of the joint.

For example, in a rotation detection mechanism of the robot disclosed in JP-A-62-264887, the optical encoder is incorporated into the joint of the robot, and a hollow tubular flange-shaped rotator provided in the optical encoder is formed at an output flange for coupling two robot elements which are relatively rotated.

Since the rotation detection mechanism of the robot disclosed in JP-A-62-264887 requires the rotator separately from the two relatively rotated robot elements and also requires components or the like for fixing the rotator, the number of components increases, and, as a result, there is a problem in that it is not easy to achieve miniaturization or reduce the weight of the robot.

SUMMARY

An advantage of some aspects of the invention is to provide a robot and an encoder capable of reducing the number of components.

The advantage can be achieved by the following configurations.

A robot according to an aspect of the invention includes a first member; a second member that is provided to be turnable about a turning axis with respect to the first member; and a mark that is disposed on a surface of the second member.

According to the robot of the aspect, since the mark is provided on the surface of the second member, it is not necessary to separately provide a member for providing the mark from the first member and the second member. Thus, it is possible to reduce the number of components.

It is preferable that the robot according to the aspect of the invention further includes a mark detection portion that is disposed in the first member and detects the mark.

With this configuration, it is possible to detect relative turning states of the first member and the second member on the basis of a detection result in the mark detection portion.

It is preferable that the robot according to the aspect of the invention further includes a driving device that is provided in the first member and turns the second member with respect to the first member.

With this configuration, the mark detection portion is provided in the first member on the same side as the driving device. Thus, it is possible to simplify wirings for the mark detection portion and the driving device, and, as a result, the robot can be miniaturized and made lightweight.

It is preferable that the robot according to the aspect of the invention further includes a determination portion that determines turning states of the second member with respect to the first member on the basis of a detection result in the mark detection portion.

With this configuration, it is possible to detect turning states such as a turning angle, a turning position, and a turning speed of the second member with respect to the first member.

In the robot according to the aspect of the invention, it is preferable that the mark detection portion includes an imaging element that images the mark, and the determination portion performs image recognition on the mark on the basis of an imaging result in the imaging element, and determines the turning states by using a result of the image recognition.

With this configuration, it is possible to implement the robot including an optical absolute type encoder. For example, if a plurality of different marks are disposed to be arranged in the circumferential direction, and relationships between the respective marks and relative turning states of the first member and the second member are set in advance, it is possible to determine turning states such as a relative turning angle or turning position of the first member and the second member by using an image recognition result. It is possible to determine turning states with high accuracy by using image recognition even if the mark is blurred due to stain or the like.

In the robot according to the aspect of the invention, it is preferable that the determination portion uses template matching for the image recognition.

With this configuration, it is possible to considerably increase the accuracy of image recognition even if the mark is blurred due to stain or the like.

In the robot according to the aspect of the invention, it is preferable that the mark detection portion includes a light emitting element that emits light toward the mark; and a light receiving element to which the light reflected from the mark is incident, and the determination portion determines the turning states on the basis of light reception intensity in the light receiving element.

With this configuration, it is possible to implement the robot including an optical incremental type encoder.

In the robot according to the aspect of the invention, it is preferable that a direction in which the mark and the mark detection portion are arranged is a direction along the turning axis.

With this configuration, it is possible to increase a length in the circumferential direction of a region in which the mark is disposed. Thus, it is possible to increase the number of marks arranged in the circumferential direction, and, as a result, it is possible to detect relative turning states of the first member and the second member with high accuracy.

In the robot according to the aspect of the invention, it is preferable that a direction in which the mark and the mark detection portion are arranged is a direction intersecting the turning axis.

With this configuration, the mark and the mark detection portion can be made close to the turning axis. As a result, the first member or the second member can be miniaturized and made lightweight.

In the robot according to the aspect of the invention, it is preferable that the mark is configured to include at least one of a depression and a protrusion, or is configured by using an adhered substance.

With this configuration, the mark can be relatively easily and highly accurately provided on the first member or the second member in a direct manner.

An encoder according to another aspect of the invention includes a base portion; a turning portion that is provided to be turnable about a turning axis with respect to the base portion; marks that are disposed around the turning axis on the turning portion; an imaging element that is disposed in the base portion; and a determination portion that performs image recognition on the marks on the basis of an imaging result in the imaging element, and determines turning states of the turning portion with respect to the base portion by using a result of the image recognition.

According to the encoder of the aspect, it is possible to implement an optical absolute type encoder. For example, if a plurality of different marks are disposed to be arranged in the circumferential direction, and relationships between the respective marks and turning states are set in advance, it is possible to determine turning states such as a turning angle or a turning position of the turning portion by using an image recognition result. It is possible to determine turning states with high accuracy by using image recognition even if the marks are blurred due to stain or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
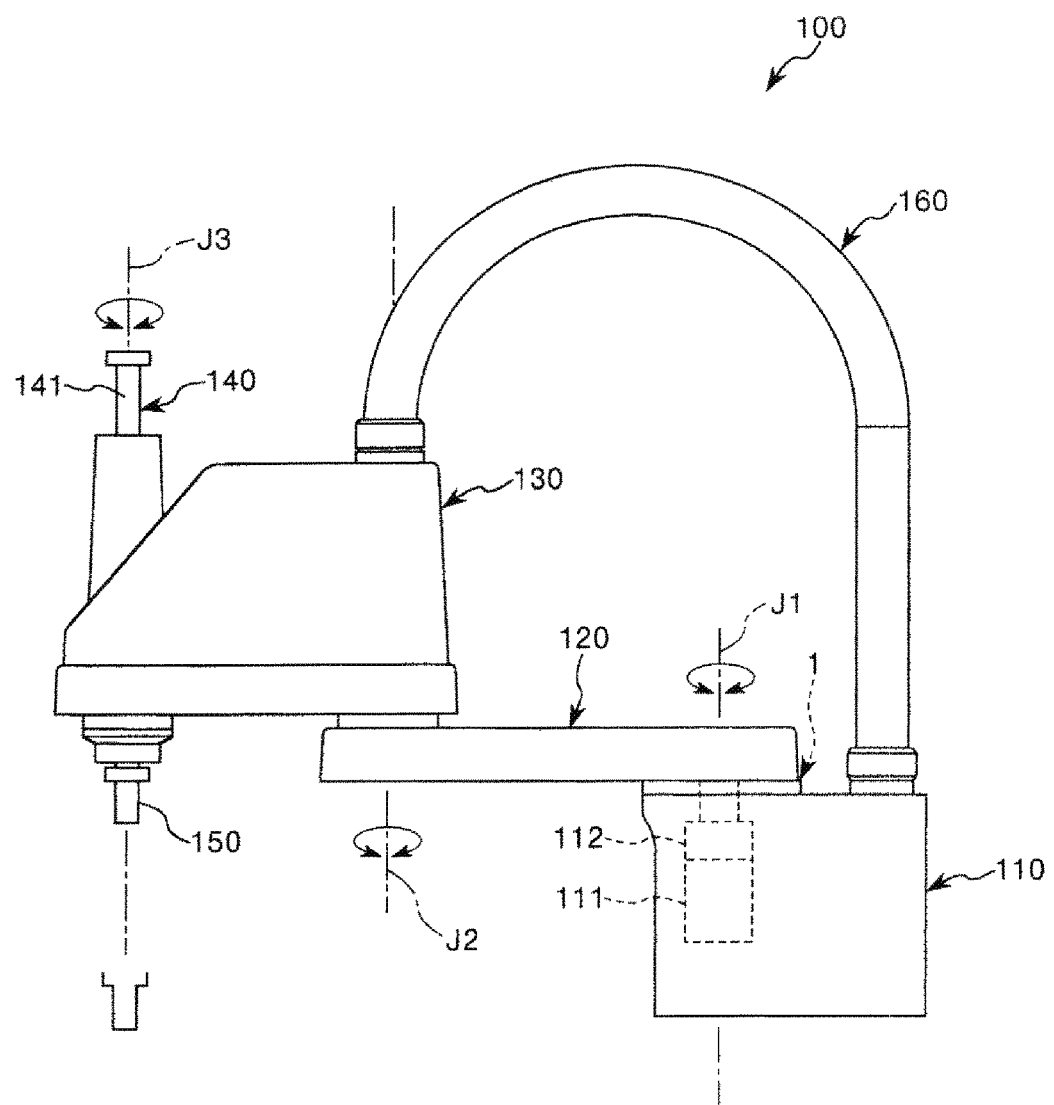
FIG. 1 is a side view illustrating a robot according to a first embodiment of the invention.

Hereinafter, a detailed description will be made of a robot and an encoder according to embodiments of the invention with reference to the drawings.
First Embodiment
Robot FIG. 1 is a side view illustrating a robot according to a first embodiment of the invention. In the following description, for convenience of description, in FIG. 1, an upper part is referred to as an "upper side", and a lower part is referred to as a "lower side". In FIG. 1, a base side is referred to as a "basal end", and an opposite side (hand side) thereto is referred to as a "distal end". In FIG. 1, an upward-and-downward direction is referred to as a "vertical direction", and a leftward-and-rightward direction is referred to as a "horizontal direction".

A robot 100 illustrated in FIG. 1, which is a so-called horizontal articulated robot (scalar robot), is used for a manufacturing process of manufacturing, for example, precision equipment, and can perform holding or transport of the precision equipment or components.

As illustrated in FIG. 1, the robot 100 includes a base 110, a first arm 120, a second arm 130, a work head 140, an end effector 150, and a wiring routing portion 160. Hereinafter, the respective portions of the robot 100 will be described briefly in order.

The base 110 is fixed to, for example, a floor surface (not illustrated) via bolts or the like. The first arm 120 is connected to an upper end of the base 110. The first arm 120 is turnable about a first axis J1 along the vertical direction with respect to the base 110.

The base 110 is provided with a first motor 111 which generates a driving force for turning the first arm 120, and a first decelerator 112 which reduces the driving force from the first motor 111. An input shaft of the first decelerator 112 is connected to a rotation shaft of the first motor 111, and an output shaft of the first decelerator 112 is connected to the first arm 120. Thus, if the first motor 111 is driven, and a driving force therefrom is forwarded to the first arm 120 via the first decelerator 112, the first arm 120 is turned about the first axis J1 in a horizontal plane with respect to the base 110.

An encoder 1 which is a first encoder detecting a state of the first arm 120 being turned with respect to the base 110 is provided at the base 110 and the first arm 120.

A distal end of the first arm 120 is connected to the second arm 130. The second arm 130 is turnable about a second axis J2 along the vertical direction with respect to the first arm 120. Although not illustrated, the second arm 130 is provided with a second motor which generates a driving force for turning the second arm 130, and a second decelerator which reduces the driving force from the second motor. The driving force from the second motor is forwarded to the second arm 130 via the second decelerator, and thus the second arm 130 is turned about the second axis J2 in a horizontal plane with respect to the first arm 120. Although not illustrated, the second motor is provided with a second encoder which detects a state of the second arm 130 being turned with respect to the first arm 120.

The work head 140 is disposed at a distal end of the second arm 130. The work head 140 includes a spline shaft 141 inserted into a spline nut and a ball screw nut (none illustrated) which are disposed in the same scale at the distal end of the second arm 130. The spline shaft 141 can be rotated about an axis thereof and can be moved up and down in the vertical direction, with respect to the second arm 130.

Although not illustrated, the second arm 130 is provided with a rotation motor and a lifting motor. If a driving force from the rotation motor is forwarded to the spline nut via a driving force forwarding mechanism (not illustrated), and thus the spline nut is rotated in normal and reverse directions, the spline shaft 141 is rotated in the normal and reverse directions about an axis J3 along the vertical direction. Although not illustrated, the rotation motor is provided with a third encoder which detects a state of the spline shaft 141 being turned with respect to the second arm 130.

On the other hand, if a driving force from the lifting motor is forwarded to the ball screw nut via a driving force forwarding mechanism (not illustrated), and thus the ball screw nut is rotated in normal and reverse directions, the spline shaft 141 is moved up and down. The lifting motor is provided with a fourth encoder detecting a movement amount of the spline shaft 141 with respect to the second arm 130.

A distal end (lower end) of the spline shaft 141 is connected to the end effector 150. The end effector 150 is not particularly limited, and may employ, for example, an effector holding an object to be transported, or an effector processing an object to be processed.

A plurality of wires connected to the respective electronic components (for example, the second motor, the rotation motor, the lifting motor, and the first to fourth encoders) disposed in the second arm 130 are routed to the base 110 through the tubular wiring routing portion 160 which connects the second arm 130 to the base 110. The plurality of wires are collected inside the base 110, and are thus routed to a control device (not illustrated) which is provided outside the base 110 and generally controls the robot 100 along with wires connected to the first motor 111 and the encoder 1.

The configuration of the robot 100 has been described above briefly. In such a robot 100, as described above, the encoder 1 detecting a state of the first arm 120 being turned with respect to the base 110 is provided at the base 110 and the first arm 120. Hereinafter, the encoder 1 will be described in detail.

Encoder

Figure 2:
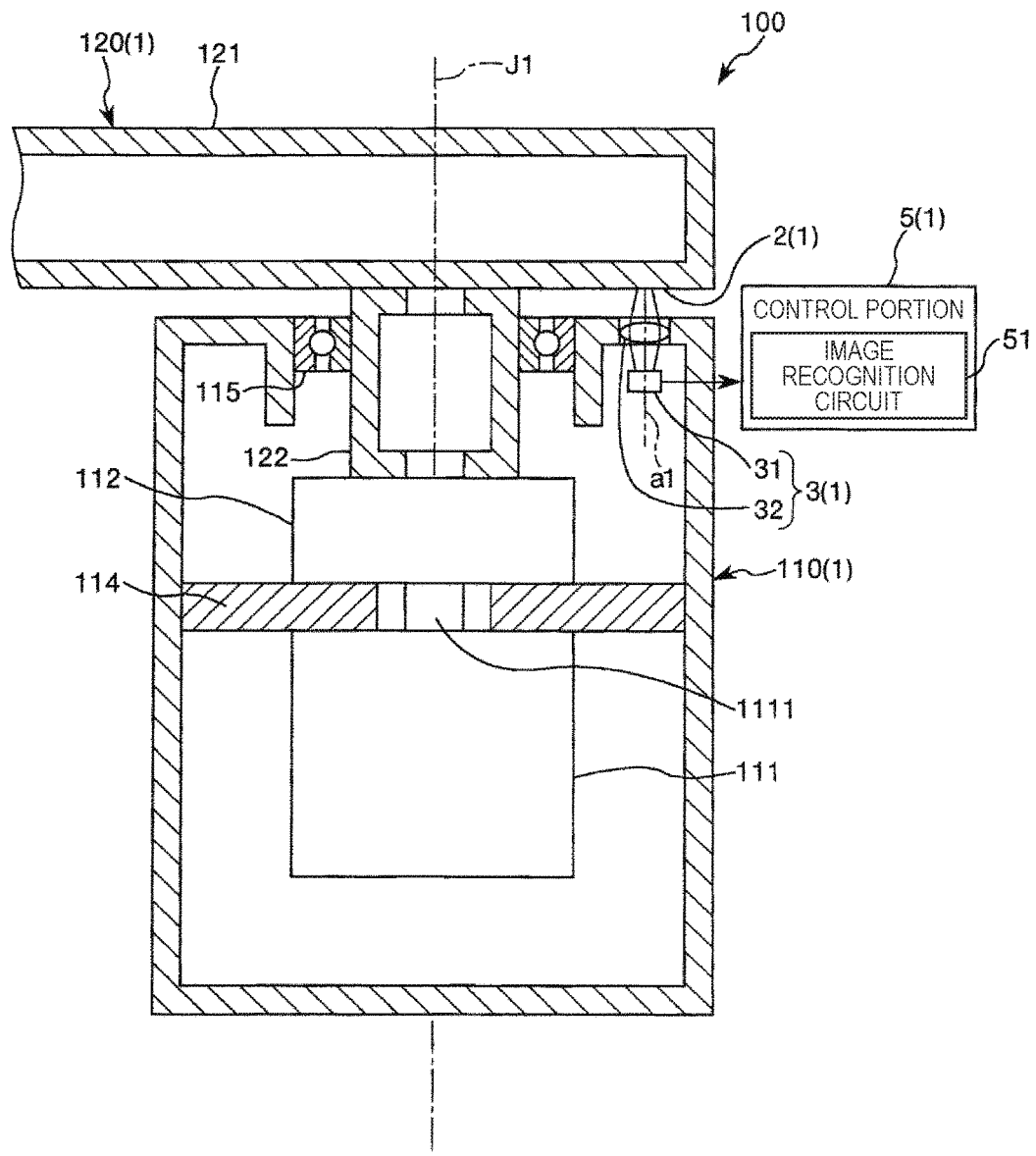
FIG. 2 is a sectional view for explaining an encoder provided in the robot illustrated in FIG. 1.
Figure 3:
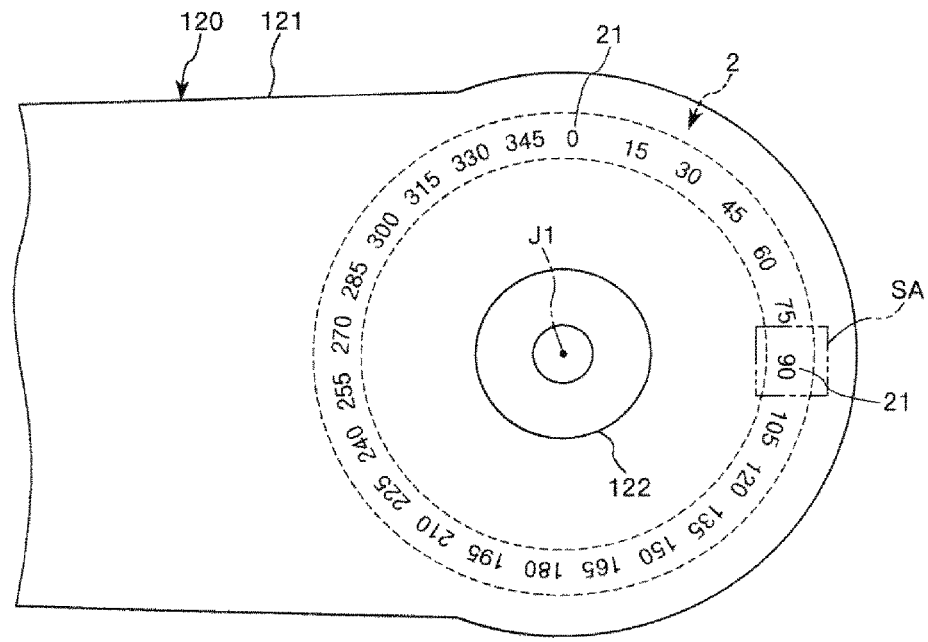
FIG. 3 is a diagram for explaining a mark provided in the encoder illustrated in FIG. 2.
Figure 4:
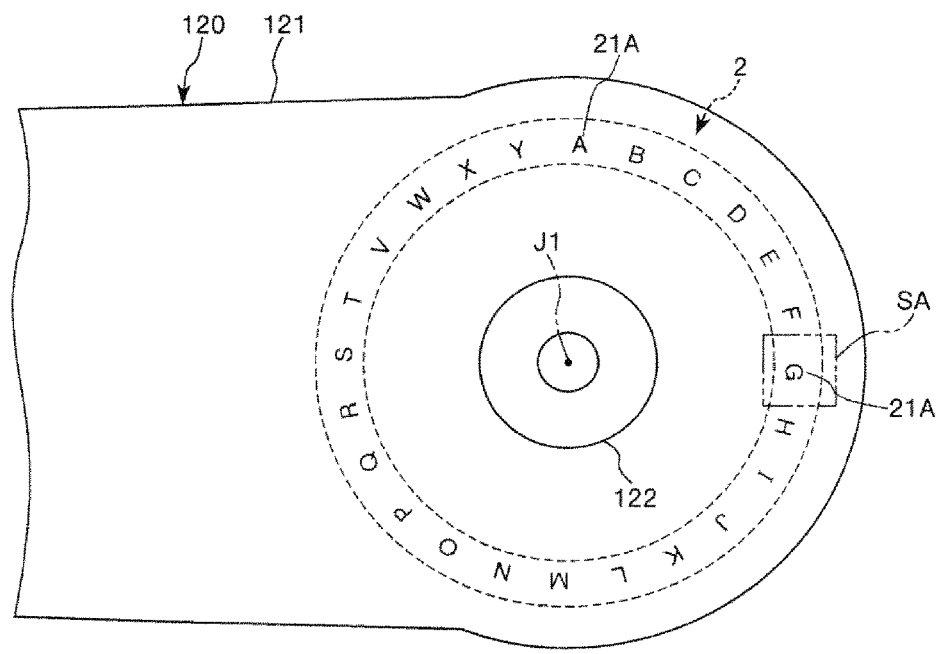
FIG. 4 is a diagram for explaining a modification example of the mark provided in the encoder illustrated in FIG. 2.

FIG. 2 is a sectional view for explaining the encoder provided in the robot illustrated in FIG. 1. FIG. 3 is a diagram for explaining a mark provided in the encoder illustrated in FIG. 2. FIG. 4 is a diagram for explaining a modification example of the mark provided in the encoder illustrated in FIG. 2.

As illustrated in FIG. 2, the base 110 includes a support member 114 which supports the first motor 111 and the first decelerator 112, and stores the first motor 111 and the first decelerator 112. The base 110 is provided with the first arm 120 which can be turned about the first axis J1.

The first arm 120 includes an arm main body portion 121 which extends along the horizontal direction, and a shaft portion 122 which protrudes downward from the arm main body portion 121, and the two portions are connected to each other. The shaft portion 122 is supported at the base 110 via a bearing 115 so as to be turned about the first axis J1, and is also connected to the output shaft of the first decelerator 112. The input shaft of the first decelerator 112 is connected to a rotation shaft 1111 of the first motor 111.

Here, the base 110 is a structural body to which a load based on the dead weight of the base 110 or the mass of other elements supported by the base 110 is applied. Similarly, the first arm 120 is also a structural body to which a load based on the dead weight of the first arm 120 or the mass of other elements supported by the first arm 120 is applied. Materials forming the base 110 and the first arm 120 are not particularly limited, and may employ, for example, metal materials.

In the present embodiment, outer surfaces of the base 110 and the first arm 120 form a part of an outer surface of the robot 100. Exterior members such as a cover and an impact absorbing material may be attached to the outer surfaces of the base 110 and the first arm 120.

The relatively turned base 110 and first arm 120 are provided with the encoder 1 detecting turning states thereof.

The encoder 1 includes a mark portion 2 provided at the first arm 120, a mark detection portion 3 provided at the base 110 and detecting the mark portion 2, and a determination portion 5 determining relative turning states of the base 110 and the first arm 120 on the basis of a detection result in the mark detection portion 3.

The mark portion 2 is provided at a portion of the arm main body portion 121 facing the base 110, that is, a portion surrounding the shaft portion 122 on a lower surface of the arm main body portion 121. As illustrated in FIG. 3, the mark portion 2 has a plurality of marks 21 disposed around the first axis J1 at positions which are different from the first axis J1.

In the present embodiment, as illustrated in FIG. 3, the plurality of marks 21 are a plurality of different position identification marks disposed to be arranged at an equal interval around the first axis J1. The plurality of marks 21 illustrated in FIG. 3 are formed by using numbers so as to respectively indicate relative turning angles of the base 110 and the first arm 120. As a method of forming the marks 21, for example, laser marking, printing, cutting, or etching may be used.

The number of marks 21 may be determined depending on a necessary resolution, and is not limited to the illustrated example, and any number may be used. An interval between the plurality of marks 21 in the circumferential direction may not be equal. The marks 21 are not limited to the illustrated Arabic numbers, and may use other numbers such as Roman numbers, Chinese numbers, and are not limited to numbers, and may use, for example, symbols, signs, tokens, marks, design, and letters other than numbers. For example, alphabets may be used, such as a plurality of marks 21A illustrated in FIG. 4. The marks 21 may not be necessarily identified by humans as long as the marks can be identified by the determination portion 5. For example, instead of the marks 21, an one-dimensional barcode or a QR code (registered trademark) may be used.

The mark detection portion 3 illustrated in FIG. 2 includes an imaging element 31 provided in the base 110, and a lens 32 provided in an opening of the base 110. The imaging element 31 images the mark 21 in the circumferential direction of apart of the mark portion 2 via the lens 32. A light source which illuminates an imaging region SA of the imaging element 31 may be provided as necessary.

As the imaging element 31, for example, a charge coupled device (CCD) or a complementary metal oxide semiconductor (CMOS) may be used. The imaging element 31 converts a captured image into an electric signal for each pixel so as to output the electric signal. The imaging element 31 may employ a two-dimensional imaging element (area image sensor) or a one-dimensional imaging element (line image sensor) (the one-dimensional imaging element is preferably disposed in a direction in which arrangement of pixels are in contact with a turning circle of the arm). In a case where the two-dimensional imaging element is used, a two-dimensional image having a large amount of information can be acquired, and thus it becomes easier to increase the accuracy of mark image recognition and mark position detection using template matching which will be described later. As a result, it is possible to perform arm position detection with high accuracy. In a case where the one-dimensional imaging element is used, since an image acquisition cycle, that is, a so-called frame rate is high, it is possible to increase a detection frequency, and thus this is advantage in terms of a high speed operation.

The lens 32 is an enlargement optical system. Consequently, it is possible to increase a resolution in an imaging region (the imaging region SA illustrated in FIG. 3) of the imaging element 31. Here, as illustrated in FIG. 3, the imaging region SA of the imaging element 31 is set to overlap a part of the mark portion 2 in the circumferential direction on the lower surface of the first arm 120. Consequently, the imaging element 31 can image the mark 21 located in the imaging region SA. Therefore, the mark 21 located in the imaging region SA is read, and thus a turning state of the first arm 120 can be understood.

In the illustrated example, the imaging region SA has a size to the extent of including at least one mark 21 of the mark portion 2. More preferably, the imaging region SA has a size of including two or more marks 21. In the above-described way, at least one mark can be made to be included in the imaging region SA without being missed even if the first arm 120 is rotated to any position, and thus it is possible to increase detection accuracy.

The determination portion 5 illustrated in FIG. 2 determines relative turning states of the base 110 and the first arm 120 on the basis of a detection result in the mark detection portion 3. The turning states may include, for example, a turning position, a turning angle, a turning speed, and a turning direction.

Particularly, the determination portion 5 includes an image recognition circuit 51 which performs image recognition on the marks 21 on the basis of an imaging result in the imaging element 31, and determines relative turning states of the base 110 and the first arm 120 by using a recognition result in the image recognition circuit 51. The image recognition circuit 51 uses, for example, template matching. The image recognition circuit 51 is not limited to using template matching as long as image recognition can be performed on the marks 21.

The determination portion 5 stores in advance table information in which the plurality of marks 21 are correlated with a relative turning angle of the base 110 and the first arm 120.

The determination portion 5 detects the mark 21 located in the imaging region SA through image recognition using the image recognition circuit 51. The determination portion 5 determines a relative turning angle of the base 110 and the first arm 120 on the basis of, for example, the image-recognized mark 21 and the table information. The determination portion 5 may more finely determine a relative turning angle of the base 110 and the first arm 120 on the basis of a position of the mark 21 located in the imaging region SA. The determination portion 5 may determine a turning speed on the basis of a time interval at which the mark 21 is detected, or may determine a turning direction on the basis of an order of the detected marks 21.

The determination portion 5 outputs a signal corresponding to the above-described determination result, that is, a signal corresponding to turning states of the base 110 and the first arm 120. This signal is input to, for example, the control device (not illustrated), and is used to control an operation of the robot 100.

The above-described robot 100 includes the base 110 which is a first member, the first arm 120 which is a second member provided to be relatively turnable about the first axis J1 which is a turning axis with respect to the base 110, the marks 21 which are disposed around the first axis J1 on the surface of the first arm 120, and the mark detection portion 3 which is disposed in the base 110 and detects the marks 21.

According to the robot 100, the marks 21 are provided on the surface of the first arm 120, and thus it is not necessary to separately provide a member for providing the marks 21 from the base 110 and the first arm 120. Thus, it is possible to reduce the number of components.

The marks 21 may be provided on the base 110, and the mark detection portion 3 may be provided in the first arm 120. In this case, for example, the marks 21 may be provided on the upper surface of the base 110, and the mark detection portion 3 may be provided in the first arm 120 so as to detect the marks 21. In this case, it can be said that the first arm 120 is a "first member", and the base 110 is a "second member".

The robot 100 includes the first motor 111 and the first decelerator 112 which are provided in the base 110 as a first member, and form a driving device turning the first arm 120 as a second member with respect to the base 110. Consequently, the mark detection portion 3 is provided in the base 110 on the same side as the first motor 111 and the first decelerator 112. Thus, it is possible to simplify wirings for the mark detection portion 3, the first motor 111, and the first decelerator 112, and, as a result, the robot 100 can be miniaturized and made lightweight.

The robot 100 includes the determination portion 5 determines turning states of the first arm 120 as a second member with respect to the base 110 as a first member on the basis of a detection result in the mark detection portion 3. Consequently, it is possible to detect turning states such as a turning angle, a turning position, and a turning speed of the first arm 120 with respect to the base 110.

In the present embodiment, the mark detection portion 3 includes the imaging element 31 which images the mark 21. The determination portion 5 performs image recognition on the mark 21 on the basis of an imaging result in the imaging element 31, and determines turning states of the first arm 120 with respect to the base 110 by using an image recognition result. Consequently, it is possible to implement the robot 100 including the encoder 1 which is an optical absolute type encoder. Specifically, if a plurality of different marks 21 are disposed to be arranged in the circumferential direction, and relationships between the respective marks 21 and relative turning states of the base 110 and the first arm 120 are set in advance, it is possible to determine turning states such as a relative turning angle or turning position of the base 110 and the first arm 120 by using an image recognition result. It is possible to determine turning states with high accuracy by using image recognition even if the marks 21 are blurred due to stain or the like.

Particularly, since the determination portion 5 uses template matching for image recognition, it is possible to considerably increase the accuracy of image recognition even if the marks 21 are blurred due to stain or the like. A seal member with which a gap between the base 110 and the first arm 120 is sealed may be provided outside the mark portion 2.

Here, the encoder 1 includes the base 110 which is a base portion, the first arm 120 which is a turning portion provided to be turnable about the first axis J1 as a turning axis with respect to the base 110, the marks 21 which are disposed around the first axis J1 on the first arm 120, the imaging element 31 which is disposed in the base 110, and the determination portion 5 which performs image recognition on the mark 21 on the basis of an imaging result in the imaging element 31, and determines turning states of the first arm 120 with respect to the base 110 by using an image recognition result. Consequently, it is possible to implement the encoder 1 which is an optical absolute type encoder. It is possible to determine turning states with high accuracy by using image recognition even if the marks 21 are blurred due to stain or the like. The "base portion" can be said to be a portion including the mark detection portion 3 of the base 110, and the "turning portion" can be said to be a portion including the marks 21 of the first arm 120.

In the present embodiment, the direction (a direction along an axial lineal illustrated in FIG. 2) in which the marks 21 and the mark detection portion 3 are arranged is a direction along the first axis J1 which is a turning axis. Consequently, it is possible to increase a length in the circumferential direction of the mark portion 2 which is a region in which the marks 21 are disposed, that is, an outer diameter of the mark portion 2. Thus, it is possible to increase the number of marks 21 arranged in the circumferential direction, and, as a result, it is possible to detect relative turning states of the base 110 and the first arm 120 with high accuracy (with high resolution).

Each of the marks 21 is configured to include at least one of a depression and a protrusion. Alternatively, the marks 21 may be formed by using adhered substances such as a colorant, an organic film, an inorganic film, and a metal oxide film. Consequently, the marks 21 can be relatively easily and highly accurately provided on the first arm 120 in a direct manner.

Second Embodiment

Figure 5:
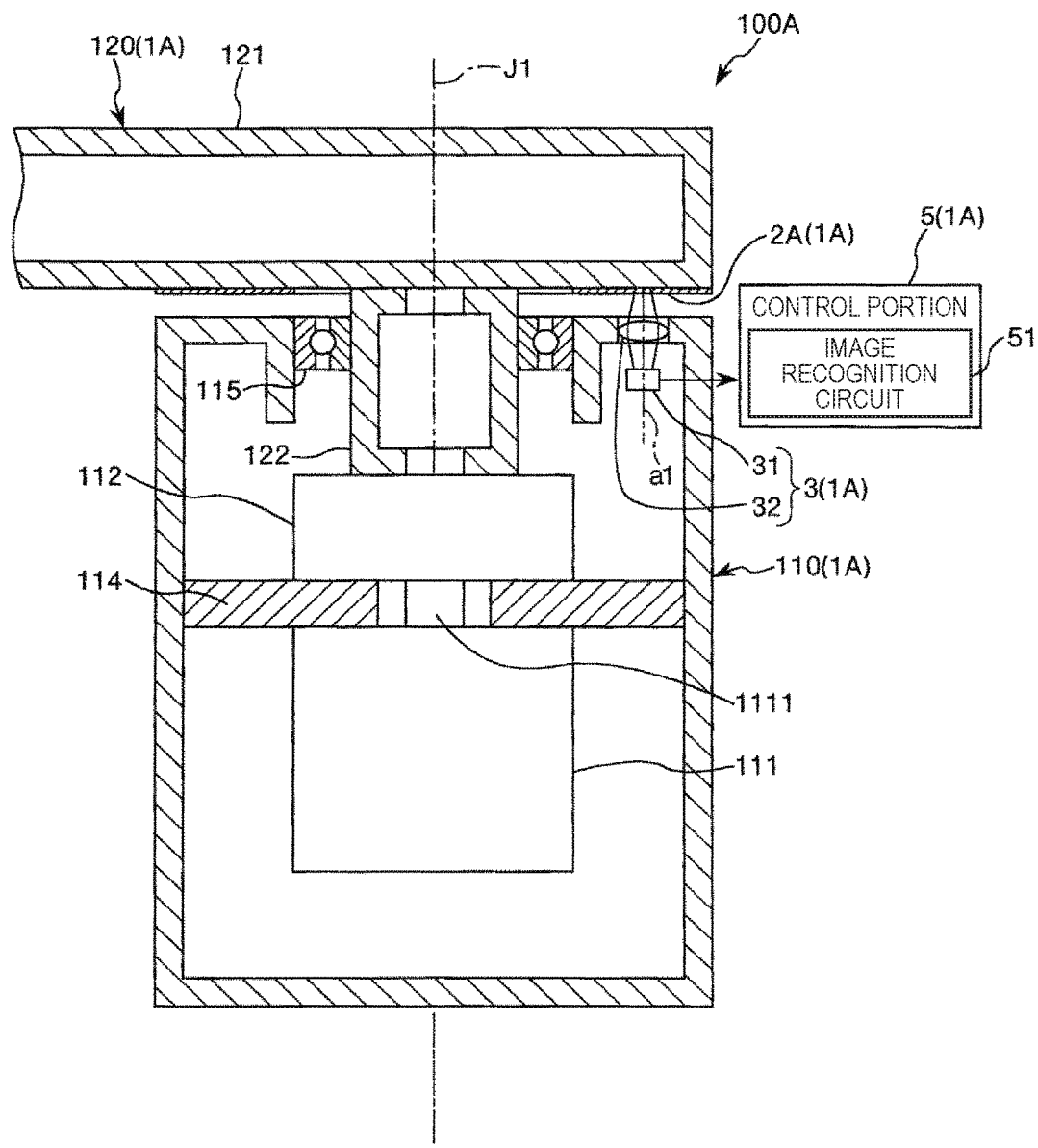
FIG. 5 is a sectional view for explaining an encoder provided in a robot according to a second embodiment of the invention.

FIG. 5 is a sectional view for explaining an encoder provided in a robot according to a second embodiment of the invention.

Hereinafter, the second embodiment will be described, but differences from the above-described embodiment will be focused, and a description of the same content will be omitted. In FIG. 5, the same constituent elements as in the above-described embodiment are given the same reference numerals.

The present embodiment is the same as the first embodiment except for a configuration of a mark.

A robot 100A and an encoder 1A illustrated in FIG. 5 are the same as those in the first embodiment except that a mark portion 2A is provided instead of the mark portion 2 of the robot 100 and the encoder 1 of the first embodiment.

The mark portion 2A is made of a sheet-shaped or plate-shaped base material. One surface of the mark portion 2A is bonded (stuck to) the surface of the first arm 120 via, for example, an adhesive. For example, the same marks (not illustrated) as the marks 21 of the first embodiment are disposed on the other surface of the mark portion 2A. As a method of forming the marks in the mark portion 2A, the same methods as in the first embodiment may be used.

Since the mark portion 2A has a form such as a sticker, the mark portion 2A can be easily replaced with new one, for example, in a case where the marks displayed on the mark portion 2A are severely damaged. The new mark portion 2A may be stuck to the old mark portion 2A in an overlapping manner.

Also in the above-described second embodiment, it is possible to reduce the number of components.

Third Embodiment

Figure 6:
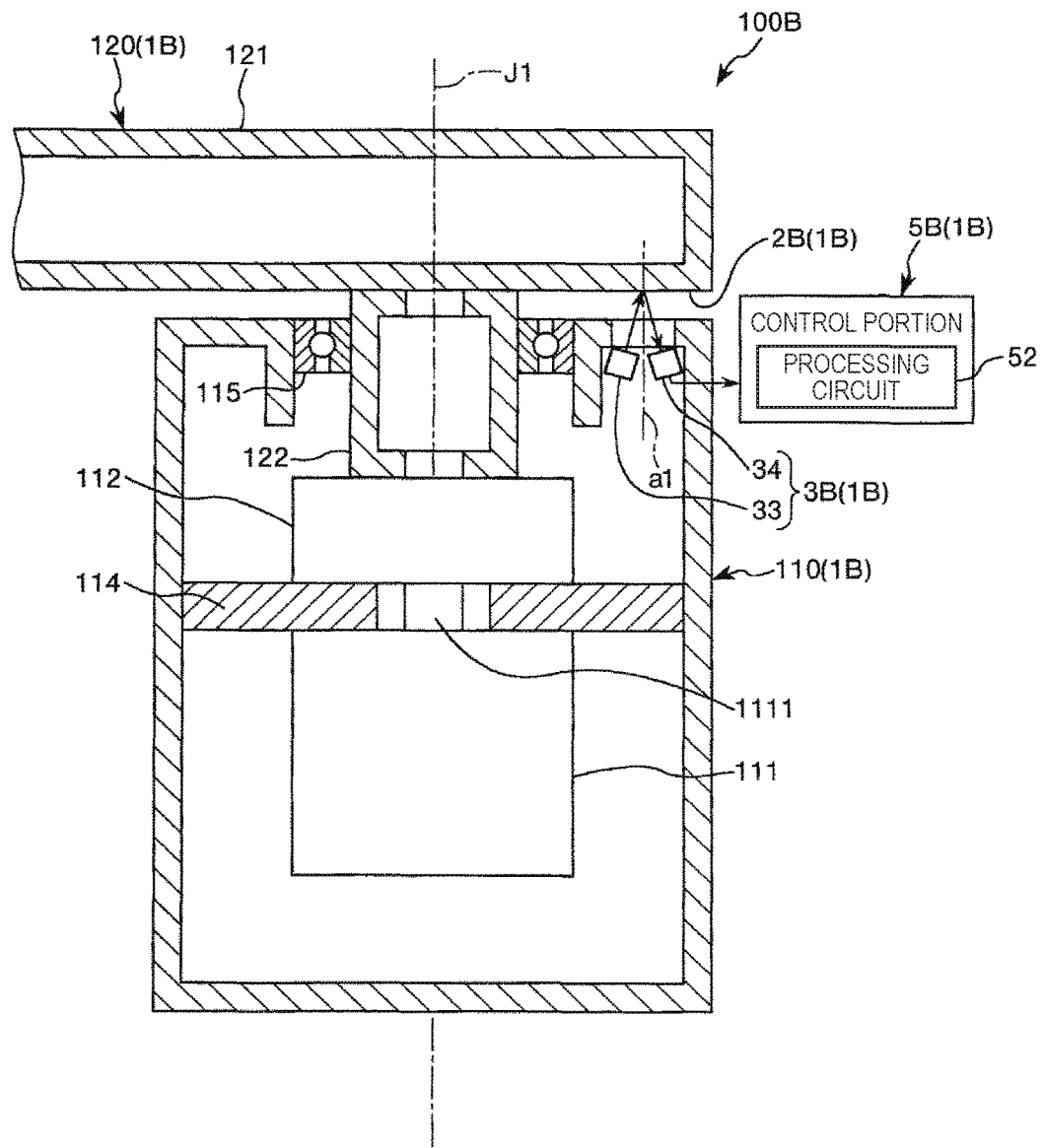
FIG. 6 is a sectional view for explaining an encoder provided in a robot according to a third embodiment of the invention.
Figure 7:
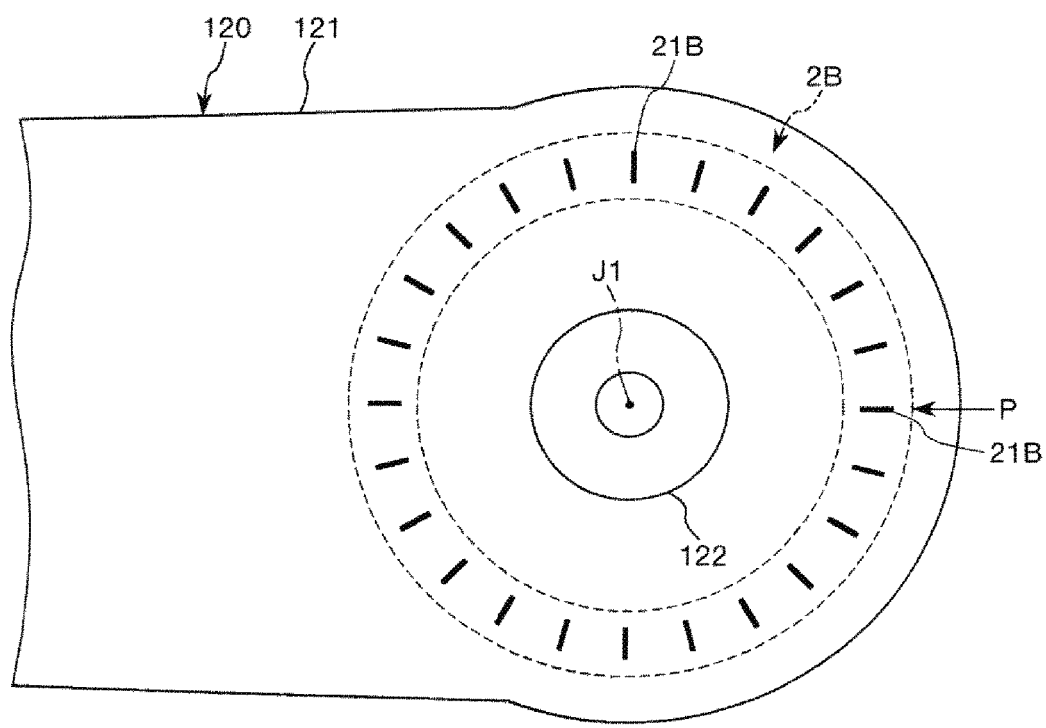
FIG. 7 is a diagram for explaining a mark provided in the encoder illustrated in FIG. 6.

FIG. 6 is a sectional view for explaining an encoder provided in a robot according to a third embodiment of the invention. FIG. 7 is a diagram for explaining marks provided in the encoder illustrated in FIG. 6.

Hereinafter, the third embodiment will be described, but differences from the above-described embodiments will be focused, and a description of the same content will be omitted. In FIGS. 6 and 7, the same constituent elements as in the above-described embodiment are given the same reference numerals.

The present embodiment is the same as the first embodiment except for configurations of a mark, a mark detection portion, and a determination portion.

A robot 100B and an encoder 1B illustrated in FIG. 6 are the same as those in the first embodiment except that a mark portion 2B, a mark detection portion 3B, and a determination portion 5B are provided instead of the mark portion 2, the mark detection portion 3, and the determination portion 5 of the robot 100 and the encoder 1 of the first embodiment.

As illustrated in FIG. 7, the mark portion 2B has a plurality of marks 21B disposed to be arranged at an equal interval around the first axis J1 on the lower surface of the arm main body portion 121 of the first arm 120. Each of the plurality of mark 21B is a scale mark formed in a line shape extending in a radial direction which is a direction toward the first axis J1. Shapes, the number, arrangement, and the like of the respective marks 21B are not limited to the illustrated ones.

On the other hand, the mark detection portion 3B includes a light emitting element 33 which emits light toward the mark 21B located at a position P in the circumferential direction of the mark portion 2B, and a light receiving element 34 to which light reflected from the mark 21B is incident. Examples of the light emitting element 33 may include a semiconductor laser element, and a light emitting diode. Examples of the light receiving element 34 may include a photodiode.

The determination portion 5B includes a processing circuit 52. The processing circuit 52 determines relative turning states of the base 110 and the first arm 120 on the basis of light reception intensity in the light receiving element 34. Consequently, it is possible to implement the robot 100B including the encoder 1B which is an optical incremental type encoder.

Also in the above-described third embodiment, it is possible to reduce the number of components.

Fourth Embodiment

Figure 8:
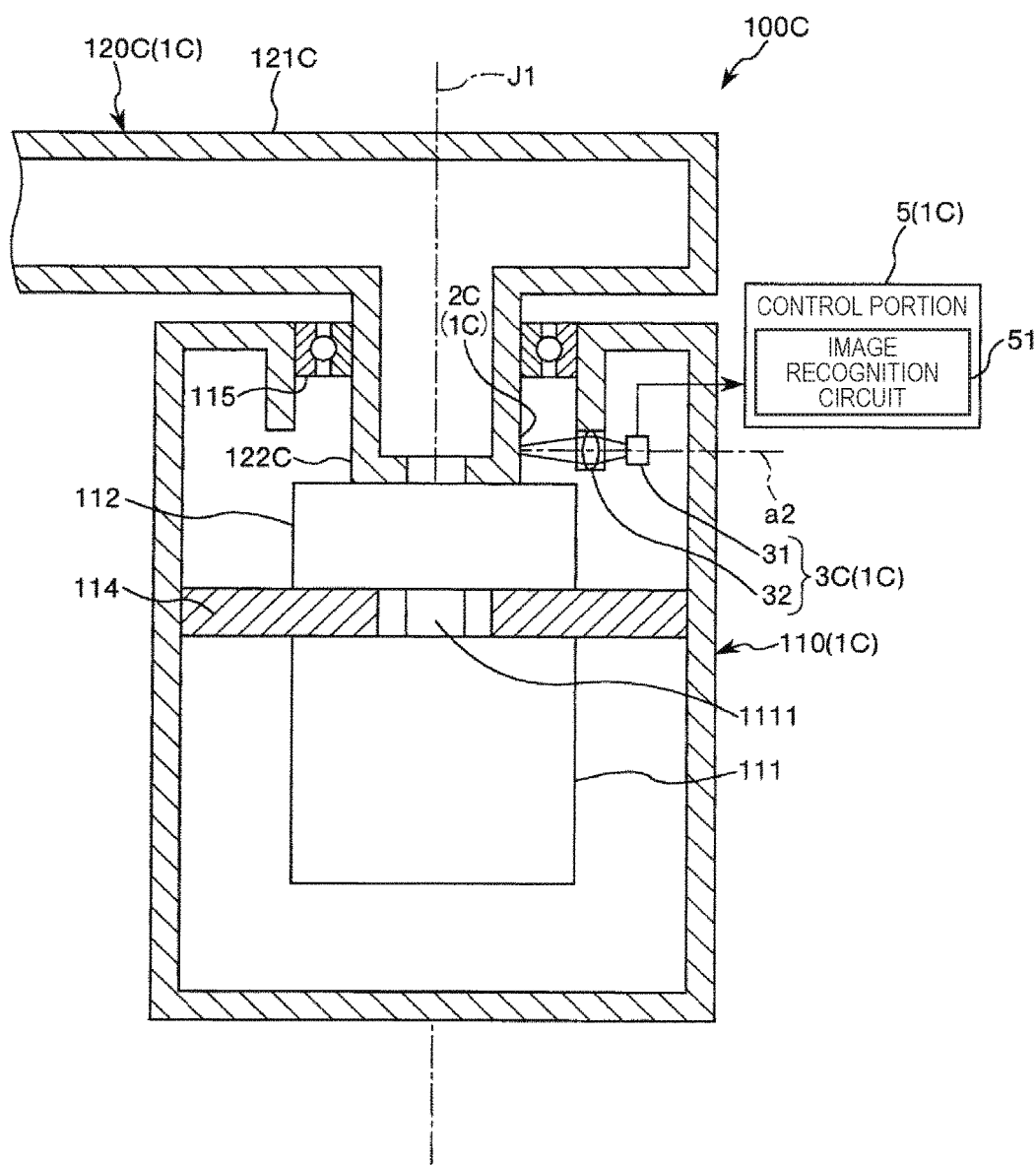
FIG. 8 is a sectional view for explaining an encoder provided in a robot according to a fourth embodiment of the invention.

FIG. 8 is a sectional view for explaining an encoder provided in a robot according to a fourth embodiment of the invention.

Hereinafter, the fourth embodiment will be described, but differences from the above-described embodiments will be focused, and a description of the same content will be omitted. In FIG. 8, the same constituent elements as in the above-described embodiment are given the same reference numerals.

The present embodiment is the same as the first embodiment except for configurations of a mark and a mark detection portion.

A robot 100C and an encoder 1C illustrated in FIG. 8 are the same as those in the first embodiment except that a mark portion 2C and a mark detection portion 3C are provided instead of the mark portion 2 and the mark detection portion 3 of the robot 100 and the encoder 1 of the first embodiment.

The mark portion 2C is disposed on a circumferential surface of the shaft portion 122 of the first arm 120. The mark portion 2C has marks (not illustrated) disposed around the first axis J1 in the circumferential direction. For example, the same marks as the marks 21 of the first embodiment may be used as the marks. In other words, a plurality of marks which can be identified, such as letters, numbers, or symbols are disposed to be arranged in the circumferential direction on the circumferential surface (cylindrical surface) of the shaft portion 122.

The mark detection portion 3C includes an imaging element 31 and a lens 32 which are disposed to detect the marks of the mark portion 2C.

In the present embodiment, the direction (a direction along an axial line a2 illustrated in FIG. 8) in which the marks 21 of the mark portion 2C and the mark detection portion 3C are arranged is a direction (an orthogonal direction in the present embodiment) intersecting the first axis J1 which is a turning axis. Consequently, the marks of the mark portion 2C and the mark detection portion 3C can be made close to the first axis J1. As a result, the base 110 can be miniaturized and made lightweight.

Also in the above-described fourth embodiment, it is possible to reduce the number of components.

As mentioned above, the robots and the encoders according to the preferred embodiments of the invention have been described, but the invention is not limited thereto, and a configuration of each portion may be replaced with any configuration having the same function. Any other constituent element may be added thereto.

In the above-described embodiments, a description has been made of an exemplary case where the robot base is a "first member" or a "base portion", the first arm is a "second member" or a "turning portion", but this is only an example, and, of any two members which are relatively turned, one member may be a "first member" or a "base portion", the other member may be a "second member" or a "turning portion". In other words, a location where the encoder is provided is not limited to a joint between the base and the first arm, and may be a joint between any two arms which are relatively turned. A location where the encoder is provided is not limited to a joint of the robot.

In the above-described embodiments, the number of arms of the robot is one, but the number of arms of the robot is not limited thereto, and may be, for example, two or more. In other words, the robot according to the embodiments of the invention may be, for example, a robot with two arms or a robot with a plurality of arms.

In the above-described embodiments, the number of arms of the robot is two, but the number of arms of the robot is not limited thereto, and may be, for example, one, or three or more.

In the above-described embodiments, a location where the robot according to the embodiments of the invention is provided is not limited to a floor surface, and may be, for example, a ceiling surface or a sidewall surface. The robot according to the embodiments of the invention is not limited to being provided to be fixed to a structure such as a building, and may be, for example, a leg type walking (traveling) robot having legs.

In the above-described embodiments, as an example of a robot according to the embodiments of the invention, the horizontal articulated robot has been described, but a robot according to the embodiments of the invention may be robots of other types such as a vertical articulated robot as long as two members which are relatively turned are provided therein.

In the above-described embodiments, a description has been made of an exemplary case where a plurality of marks are arranged around the turning axis, but this is only an example, and, for example, a single mark having different shades depending on positions in a circumferential direction may be used.

The entire disclosure of Japanese Patent Application No. 2016-063906, filed Mar. 28, 2016 is expressly incorporated by reference herein.

What is claimed is:

1. A robot comprising:
a base;
an arm rotatably attached to the base and rotatable about a first axis with respect to the base; and
a mark disposed on a surface of the arm facing the base, the base including a controller configured to determine a rotational position of the arm based on the mark;
a mark detection portion that is disposed in the base and detects the mark;
a driving device that is provided in the base and turns the arm with respect to the base; and
a determination unit that determines turning states of the arm with respect to the base on the basis of a detection result in the mark detection portion,
wherein the mark detection portion includes an imaging element that images the mark, and
wherein the determination unit performs image recognition on the mark on the basis of an imaging result in the imaging element, and determines the turning states by using a result of the image recognition.

2. The robot according to claim 1,
wherein the determination unit uses template matching for the image recognition.

3. The robot according to claim 1,
wherein the mark detection portion includes:
a light emitting element that emits light toward the mark; and
a light receiving element to which the light reflected from the mark is incident, and
wherein the determination unit determines the turning states on the basis of light reception intensity in the light receiving element.

4. The robot according to claim 1,
wherein a direction in which the mark and the mark detection portion are arranged is a direction along the turning axis.

5. The robot according to claim 1,
wherein a direction in which the mark and the mark detection portion are arranged is a direction intersecting the turning axis.

6. The robot according to claim 1,
wherein the mark is configured to include at least one of a depression and a protrusion, or is configured by using an adhered substance.

7. An encoder comprising:
a base;
an arm rotatably attached to the base and turnable about a turning axis with respect to the base;
a plurality of identification marks that are disposed around the turning axis on the arm;
an imaging element that is disposed in the base; and
a determination unit that performs image recognition on the plurality of identification marks on the basis of an imaging result in the imaging element, and determines a rotational position of the arm with respect to the base by using a result of the image recognition.

* * * * *